United States Patent [19]

Simmons et al.

[11] Patent Number: 4,524,442
[45] Date of Patent: Jun. 18, 1985

[54] MODULARLY EXPANDABLE SPACE STAGE FOR A T-S-T DIGITAL SWITCHING SYSTEM

[75] Inventors: Nathaniel Simmons, Downers Grove, Ill.; Sergio E. Puccini, Scottsdale, Ariz.; Stig E. Magnusson; Kanal I. Parikh, both of Phoenix, Ariz.

[73] Assignee: GTE Automatic Electric Inc., Northlake, Ill.

[21] Appl. No.: 506,744

[22] Filed: Jun. 22, 1983

[51] Int. Cl.³ .............................. H04Q 11/04
[52] U.S. Cl. ....................................... 370/63
[58] Field of Search ...................... 370/63, 58, 59

[56] References Cited

U.S. PATENT DOCUMENTS

| | | | |
|---|---|---|---|
| 3,956,593 | 5/1976 | Collins et al. | 370/63 |
| 4,005,272 | 1/1977 | Collins et al. | 370/63 |
| 4,320,501 | 3/1982 | Le Dieu et al. | 370/63 |
| 4,402,077 | 8/1983 | Simmons et al. | 370/63 |

Primary Examiner—Douglas W. Olms
Attorney, Agent, or Firm—Anthony Miologos; Peter Xiarhos

[57] ABSTRACT

A space stage for a T-S-T digital switching system is shown arranged into four identical space stage units (SSU). Each SSU is arranged into modular functional elements. The elements are combined in each SSU to allow the space stage to grow modularly, interconnecting from thirty-two to sixty-four originating time and terminating time stages.

24 Claims, 5 Drawing Figures

FIG. 5

MODULARLY EXPANDABLE SPACE STAGE FOR A T-S-T DIGITAL SWITCHING SYSTEM

BACKGROUND OF THE INVENTION

This invention relates in general to time-space-time (T-S-T) telecommunication switching systems, and in particular to a T-S-T switching system having a modularly expandable space stage.

Time-space-time (T-S-T) switching systems are a configuration of digital switching elements providing both time and space translation between channels of time division multiplexed (TDM) telecommunications transmission lines. The T-S-T network of a switching system interconnects digital bi-directional TDM communication lines with TDM communication involving the sharing of single transmission paths, individually, in time, to provide multiple channels in a single transmission medium. The construction of such a T-S-T network comprises the connection of a spacial stage between the two time stages.

Increasing the network capacity of a T-S-T digital switching system entails increasing the size of the time and space switching stages. The consequence of this network growth is that doubling the number of time stages increases the size of the space stage by a factor of two squared or 4 times.

Provisions for such network growth must be anticipated when such a T-S-T network is configured. Thus, a central exchange anticipating a certain amount of growth must ultimately install a space stage four times greater than its present requirements.

It would therefore be advantageous to provide a space stage for the T-S-T network of a digital switching system which has the capability to grow modularly with the time stage.

SUMMARY OF THE INVENTION

The space stage of the present invention allows for the interconnection of a plurality of originating time stages (OTS) to terminating time stages (TTS) of a digital switching system. The time stages are divided into a first time group consisting of an equal number of originating time stages and terminating time stages and a second time group including at least one originating time stage and at least one terminating time stage. The second time group has the capacity to grow to include an equal number of originating time stages and terminating time stages as found in the first time group.

The space stage is comprised of four switching matrices or space stage units (SSU), which provide time shared switching paths between the originating time stages and terminating time stages of the digital switching system.

The first SSU includes a plurality of inputs each connected to an individual originating time stage of the first time group and a plurality of outputs each connected to an inividual terminating time stage of the first time group. A plurality of control units connected to a source of control information are arranged to selectively interconnect each of the first time group terminating time stages to originating time stages.

The second SSU includes inputs and outputs to connect at least one originating time stage and at least one terminating time stage of the second time group. A control unit connected to a source of control information is arranged to selectively interconnect the second time group terminating time stage to the originating time stage. The second SSU has the capacity to grow in accordance with the growth of the second time group by expanding the switching matrix and adding additional control units.

The first and second SSUs may also be described as INTRA SSUs since they interconnect the originating time stages to the terminating time stages of their respective groups. To interconnect all originating time stages to terminating time stages between the first and second time groups in the digital switching system two additional SSUs or INTER group SSUs are used.

The third SSU includes a plurality of inputs, each connected to an individual originating time stage of the first time group and a plurality of outputs with at least one output connected to at least one terminating time stage of the second time group. A control unit connected to a source of control information is arranged to selectively interconnect at least one terminating time stage of the second time group to the originating time stages of the first time group. The third SSU also has the capacity to grow in accordance with the growth of the second time group by adding additional control units to provide the selective interconnection of all terminating time stages of the second time group to the originating time stages of the first time group.

The fourth SSU includes a plurality of inputs with at least one input connected to at least one originating time stage of the second time group and a plurality of outputs each connected to an individual terminating time stage of the first time group. A plurality of control units connected to a source of control information are arranged to selectively interconnect each terminating time stage of the first time group to at least one originating time stage of the second time group.

DESCRIPTION OF THE DRAWING

FIG. 5 is a growth table illustrating the manner in which the space stage of the present invention can grow modularly to interconnect up to sixty-four originating time stages and terminating time stages.

DESCRIPTION OF THE PREFERRED EMBODIMENT

Figure 1:
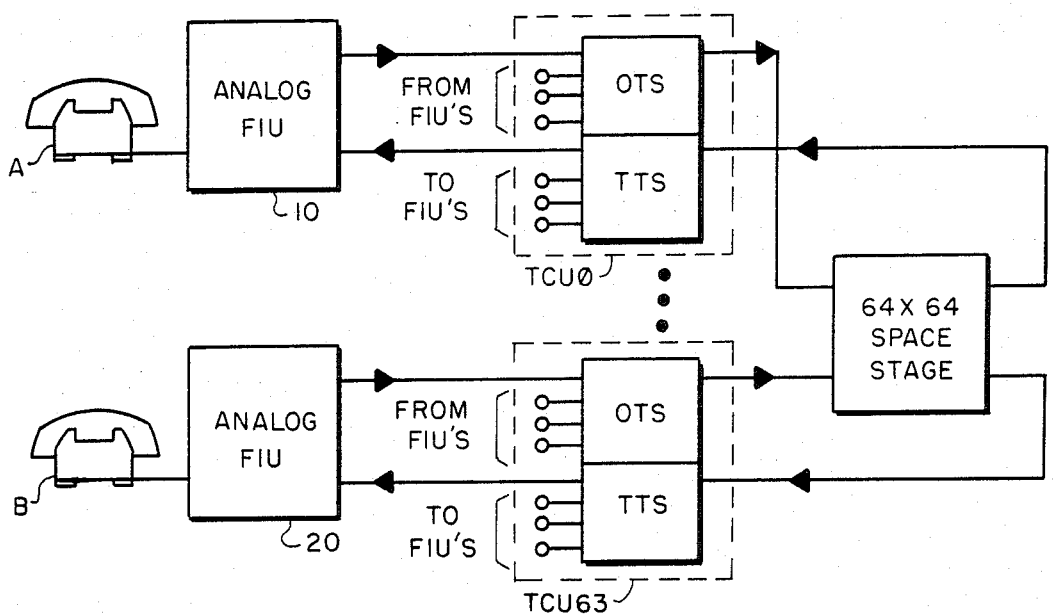
FIG. 1 is a block diagram depicting the network structure of a digital switching system.

FIG. 1, is a block diagram showing the single rail structure of a time-space-time network of a digital switching system for switching a local telephone call. Telephone subscriber A is connected to analog facility interface unit (FIU) 10. The analog FIU has a PCM voice connection to time and control unit (TCU) 0. The digital switching network may contain n number of TCUs, but will be limited to sixty-four TCUs for this embodiment. Each TCU has two time stages associated with it, an originating time stage (OTS) and a terminating time stage (TTS).

Each time stage (OTS or TTS) of each TCU may be connected to up to four FIUs. Therefore, the number of time control units (TCUs) is modularly expandable and may grow to fit the needs of the switching system. Next, a connection is made from the OTS of the particular TCU, in this example TCU 0 to the space stage 30 and the terminating time stage of TCU 63. The telephone subscriber B is then connected through analog FIU 20 to the TTS of TCU 63.

A voice transmission link is next established from subscriber B to subscriber A. This communication link is established via analog FIU 20, to the originating time stage (OTS) of TCU 63, through space stage 30, through the terminating time stage (TTS) of TCU 0, and finally through analog FIU 10 to subscriber A. At this time, a two day talking path has been established between subscribers A and B.

Figure 2:
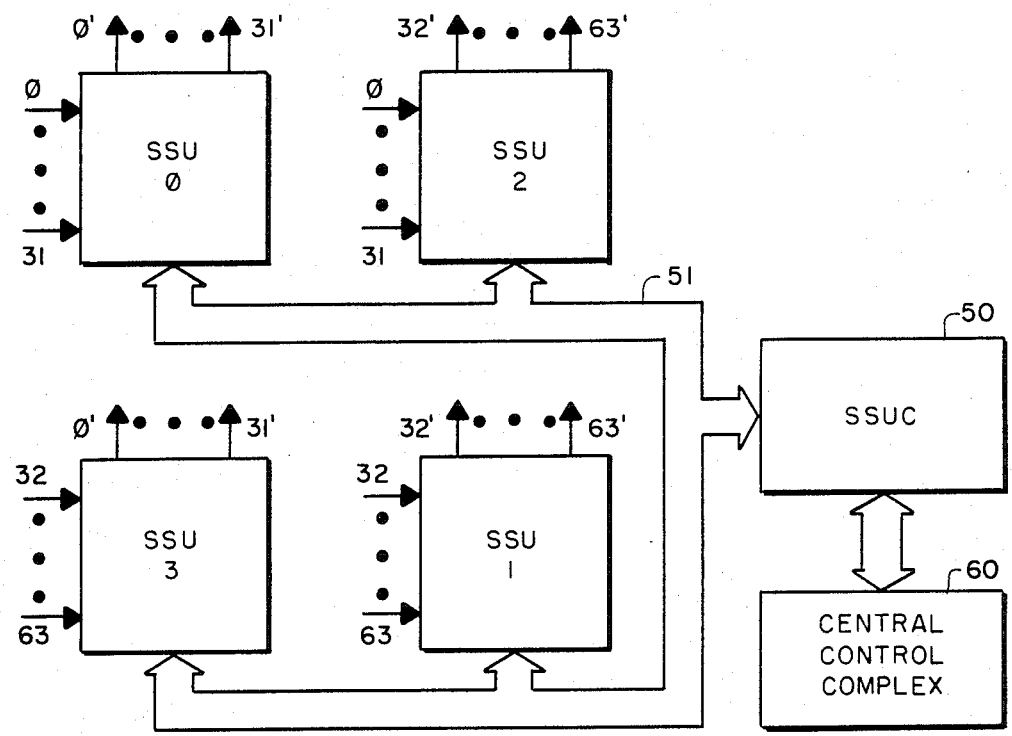
FIG. 2 is a block diagram representing the 64×64 space stage configuration of the present invention.

Turning now to FIG. 2, a representation of the 64×64 space stage 30 of FIG. 1 is illustrated. The space stage is comprised of four identical space stage units (SSU) 0, 1, 2, and 3. Each space stage unit is a 32×32 matrix having 32 inputs (0 to 31 for SSU 0, and SSU 2 and 32 to 63 for SSU 1 and SSU 3) and 32 outputs (0' to 31' for SSU 0 and SSU 3, and 32' to 63' for SSU 1 and SSU 2). Connecting paths between the inputs and outputs of each SSU are controlled by a central control complex 60 through a space stage unit controller (SSUC) 50. The SSUC interfaces the central control complex to each SSU and controls and directs the data between the SSUs and the central control complex. The SSUC communicates with each SSU module via a bus 51 which includes address, data and control lines.

Figure 3:
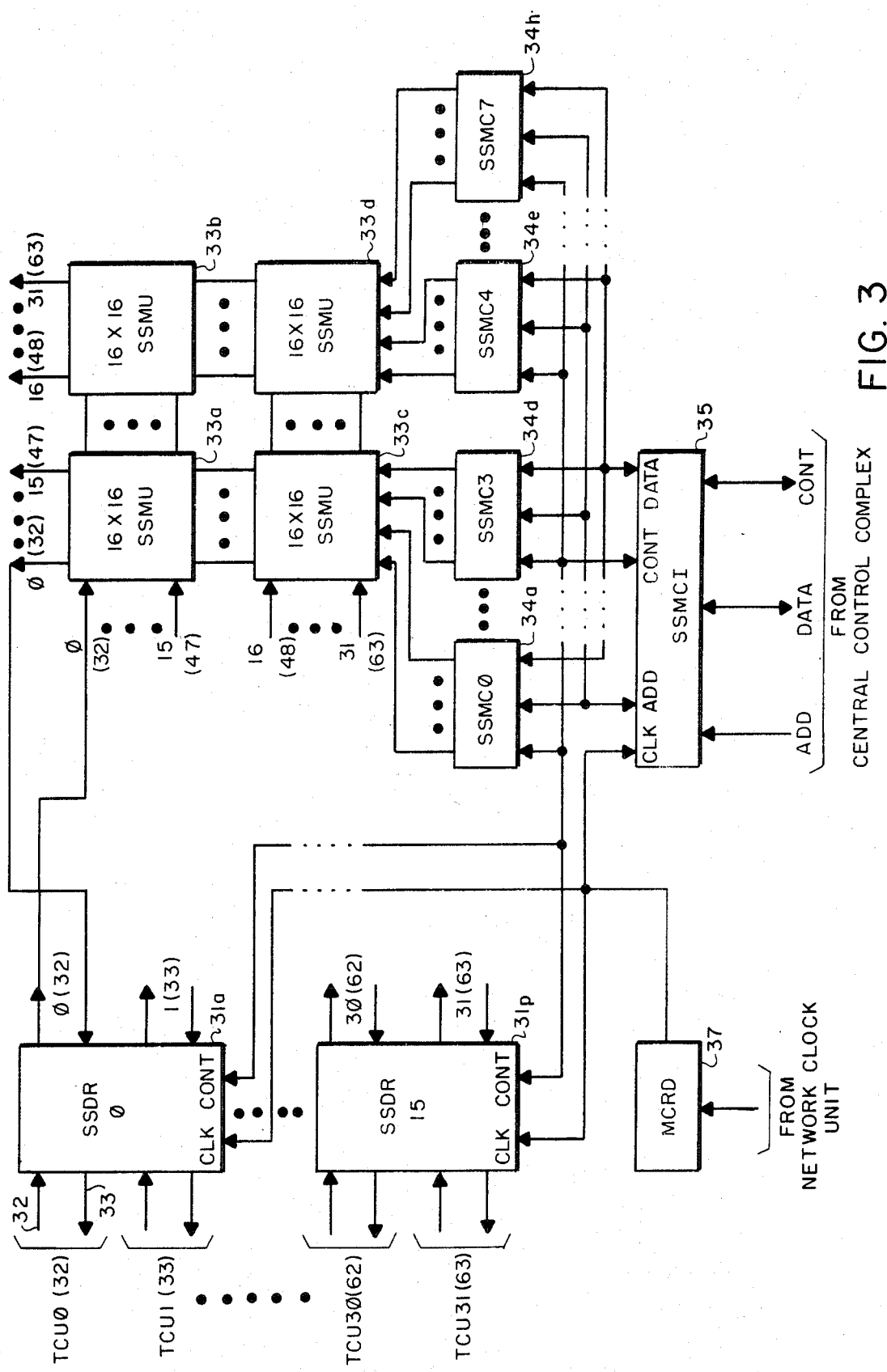
FIG. 3 is a schematic diagram of a space stage unit configured to interconnect one to thirty-two originating time stages and terminating time stages.

Turning now to FIG. 3, a schematic diagram representing a SSU of the present invention is illustrated. It should be noted, that the SSU represented in FIG. 3 is identical for each SSU, i.e. SSU 0, SSU 3, etc., shown in FIG. 2.

PCM samples from the TCUs of the T-S-T network enter and exit the SSU through a space stage driver/receiver (SSDR) interface 31a–31p. It should be noted twelve bits are required to represent the PCM sample, seven bits representing the amplitude of the voice signal, one bit represents the sign of the voice signal, three bits of supervisory signals and one parity bit. Therefore, each input to the SSU from a TCU and each output to a TCU from the SSU is twelve bits wide. Each SSDR includes drivers and receivers as well as buffers for temporarily storing PCM samples before they are sent out to the space stage matrix units (SSMU). Each SSDR 31a–31p can interface the OTS and TTS of two TCUs to the SSU. For example, input 32 of SSDR 31a would be connected to the OTS of TCU 0 for SSU 0 and SSU 2 and to the OTS of TCU 32 for SSU 3 and SSU 1. Output 33 of SSDR 31a would be connected to the TTS of TCU 0 or 32.

The space stage matrix provides a time shared switching path between the OTS and TTS of an individual TCU or between the OTS and TTS of different TCUs. The space stage matrix is comprised of four identical 16×16 space stage matrix units (SSMU) 33a–33d. Each SSMU is constructed from a plurality of 16:1 multiplexers. The multiplexers are combined into a 16×16 SSMU which is 12-bits wide. Control signals supplied to each multiplexer selects and enables the appropriate multiplexers for switching through the space stage matrix. The control signals are applied to each SSMU via a space stage memory control (SSMC). Each space stage memory control 34a–34h consists of four control memories (CM), (not shown) and their associated buffers. Each CM corresponds to a particular TCU TTS. Each CM selects, through control data written within the CM, which one of the sixteen input samples will be output. Address, data and control information are read into each SSMC via a space stage memory control interface (SSMCI). The SSMCI 35 can control eight SSMCs thereby interfacing each SSU to SSUC 50 and central control complex 60 of FIG. 2.

Finally, a timing generator or master clock receiver/distributor (MCRD) 37 is included which provides all the necessary timing signals for the operation of the SSU. The MCRD terminates a master clock signal from a network clock unit (NCU) and distributes a timing reference to the SSDRs, the SSMCs and the SSMCI.

With renewed reference to FIG. 3, a description of the operation of a SSU will be explained. PCM samples from the OTS are written into a buffer within the appropriate SSDR, addressed and strobed with timing signals transmitted from the sending TCU with the PCM samples. For example, in FIG. 3 the sample is transmitted from the TCU 0 on input 32 into a buffer within SSDR 31a. The written sample is latched out to the space stage matrix one time slot after the sample was written into the SSDR. This time slot is referred to as n+1. In time slot n, before time slot n+1, a path through the SSM is selected by reading the control memory within the appropriate SSMC. At the beginning of time slot n+1 the data written in the CM enables the appropriate multiplexers within the SSMU used to output the PCM sample. The PCM sample available at the SSDR buffer at the beginning of time slot n+1 is allowed to ripple through the addressed multiplexers and latched into the selected SSDR for transmission to a TCU near the end of the time slot. For example, the data written into the control memory associated with the TTS of TCU 0 of SSMC 34a, sets up a path through the space stage matrix from the 0 input to the 0 output of SSMU 33a. The PCM sample is latched into the appropriate buffer within SSDR 31a and sent to the TTS of TCU 0. In this manner each SSU is selectively able to provide switching paths between the thirty-two originating time stages and terminating time stages of thirty-two TCUs.

Figure 4:
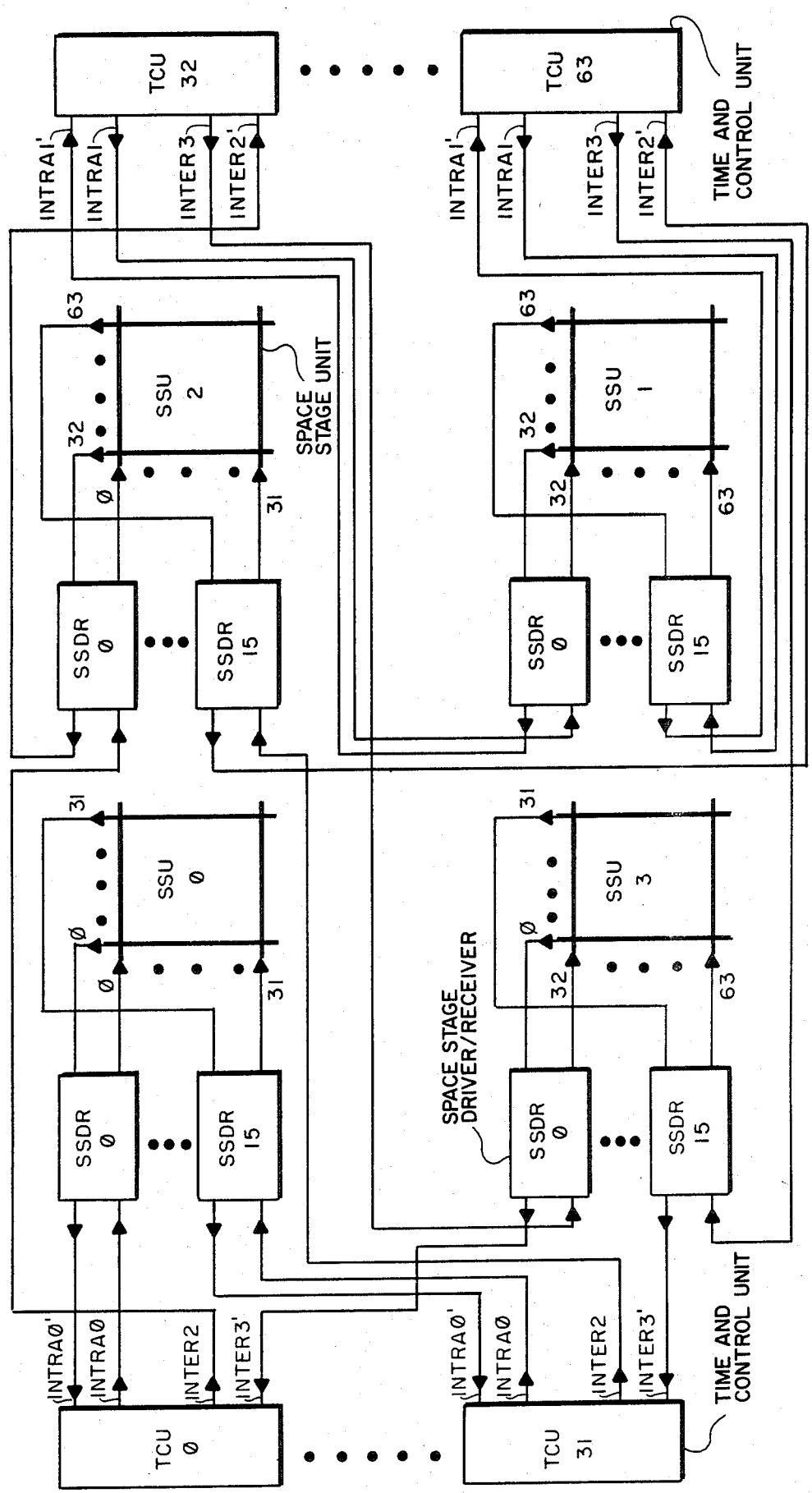
FIG. 4 is a diagram representing the interconnection of sixty-four time and control units (TCU) to the space stage of the present invention.

Turning now to FIG. 4, the complete arrangement for a 64×64 space stage for a T-S-T network is illustrated. As can be seen the arrangement is comprised of a space stage which includes four SSUs; SSUs 0, 1, 2, and 3. Each SSU shown in FIG. 4, includes the requisite SSDR interfaces.

The four SSU modules are interconnected providing time shared switching paths to sixty-four TCUs. The sixty-four TCUs are divided into a first time group, including TCUs 0 through 31 and a second time group, including TCUs 32 through 63. Each SSU is additionally categorized as either an intra-group, (SSU 0 and SSU 1) or an inter-group (SSU 2 and SSU 3). The intra-group SSU 0 interconnects the OTS and TTS of TCUs 0 through 31. Likewise, intra-group SSU 1 interconnects the OTS and TTS of TCUs 32 through 63. Time shared switching paths between the first time group of TCUs (0–31) and the second time group of TCUs (32–63) is accomplished with the inter-group SSUs; SSU 2 and SSU 3. SSU 2 connects the OTSs of TCUs 0 through 31 to the TTSs of TCUs 32 through 63 and SSU 3 connects the OTSs of TCUs 32 through 63 to the TTSs of TCUs 0 through 31.

For example, to establish a communications path from the OTS of TCU 0 to the TTS of TCU 31, TCU 0 is connected to SSU 0 through sending line INTRA 0, SSDR 0, input line 0 of SSU 0, through the SSM to output line 31, SSDR 15 and finally to TCU 31 via receiving line INTRA 0. A return path interconnection can be effected between the OTS of TCU 31 and the TTS of TCU 0 via TCU 31s sending line INTRA 0, SSDR 15, input line 31 through the SSM to output line 0, SSDR 0 and to TCU 0 via receiving line INTRA 0'. Switching paths between the first time group TCUs can be established in any combination through SSU 0 in the same manner described above.

Likewise, the second time group of TCUs (32–63) can be interconnected via sending/receiving lines INTRA 1, INTRA 1' respectively and the input/output lines of SSU 1.

To effect a switching path from the OTS of TCU 0 to the TTS of TCU 63 a connection is made via sending line INTER 2 of TCU 0, SSDR 0 of SSU 2, to input line 0 of SSU 2, through the SSM to output line 63, SSDR 15, and receiving line INTER 2' to TCU 63. The return connection to TCU 0 is effected through SSU 3 via the sending line INTER 3 of TCU 63 through SSU 3 to receiving line INTER 3' of TCU 0.

As can be readily seen in FIG. 4, SSU 2 is arranged to connect the OTSs of TCUs 0 through 31 to the TTSs of TCUs 32 through 63. Conversely, SSU 3 connects the OTSs of TCUs 32 through 63 to the TTSs of TCUs 0 through 31. Thereby, effectively interconnecting all sixty-four TCUs in the T-S-T network through the space stage.

The space stage of the present invention can grow modularly very effectively from a space stage capable of providing switching paths between thirty-two TCU to a space stage capable of providing time shared switching paths between sixty-four TCUs.

Figure 5:
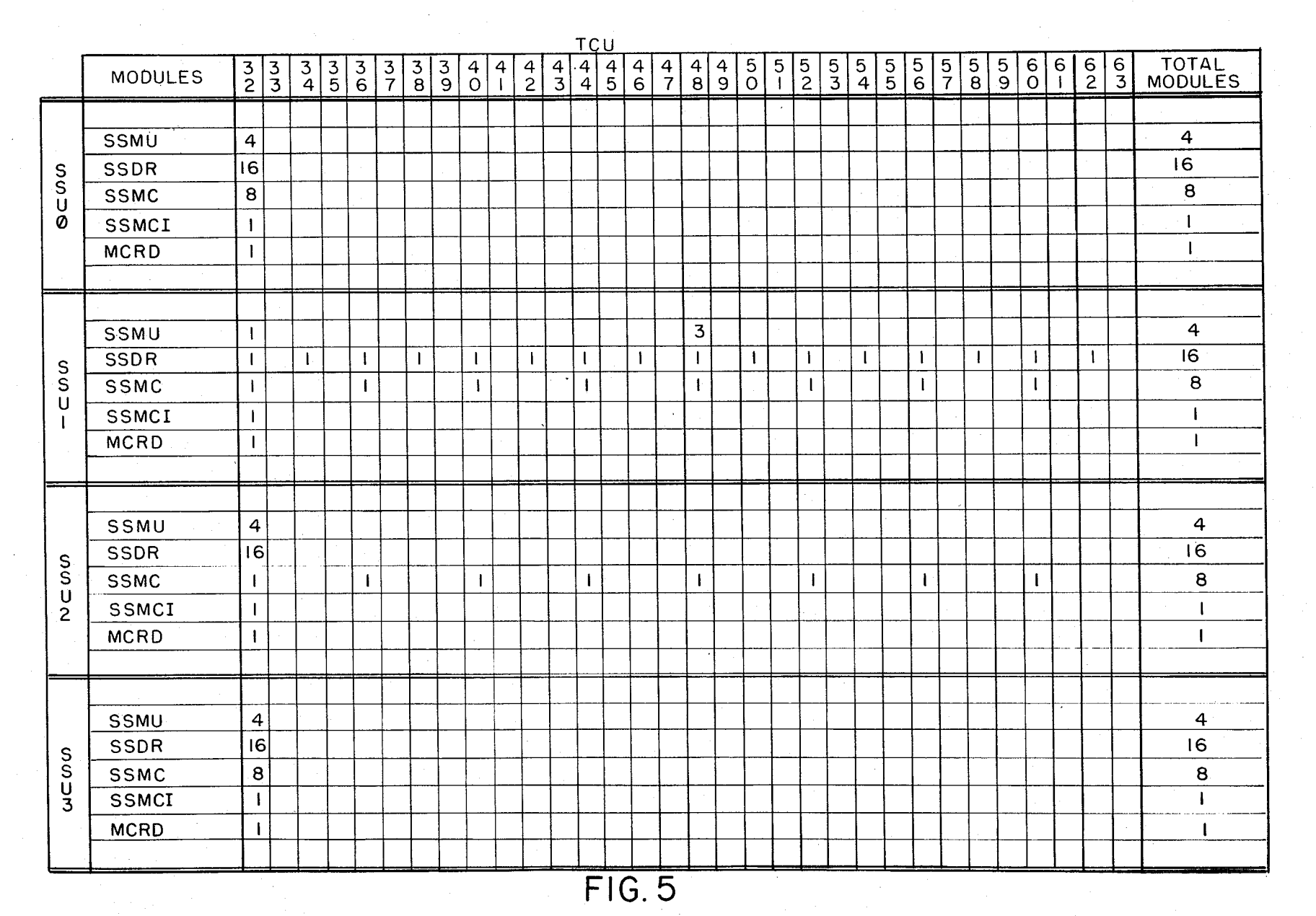

Turning to FIG. 5, a growth table showing the required amount of functional modules SSMs, SSDRs, etc. for each SSU is illustrated. As can be seen, a completely outfitted SSU 0 is required to connect to the first thirty-two TCUs (TCU 0–31). This allows intra-group connections between the OTSs and TTSs of that group. This configuration requires the functional modules illustrated in FIG. 3.

In order to add the thirty-third TCU (TCU 32), that is to go beyond the first group (0–31), three additional SSUs must be added. These additional SSUs include a partially equipped SSU 1 (intra-group SSU) which includes only that equipment required to handle a connection between the OTS and TTS of TCU 32. Therefore, one SSMU, one SSDR, one SSMC, one SSMCI and one MCRD are required. SSU 1 can then grow modularly according to the growth table to a fully populated SSU thereby able to handle intra-switching between TCUs 32 and 63. SSU 2 is also partially populated in order to interconnect the OTSs of TCUs 0 to 31 to the TTS of TCU 32. Therefore, SSU 2 must have a complete 32×32 SSMU and a complete complement of SSDRs, since thirty-two inputs must be connected via the SSDRs to TCUs 0–31. Having only one TTS connected to SSU 2, only one SSMC and SSMCI is required at this time. Since each SSMC includes four control memories able to connect to four different TCU TTSs a second SSMC is required for every four TCUs added to the network, i.e. at the thirty-sixth, fortieth, forty-fourth, etc., until SSU 2 is fully complemented to handle all sixty-four TCUs.

Finally, a completely outfitted SSU 3 is required. SSU 3 connects the OTS of TCU 32 to the TTS of TCUs 0 through 31 thereby requiring a 32×32 SSMU and a complete set of SSDR and SSMC modules.

Therefore, the space stage in the T-S-T network of the present invention can be expanded readily to handle from thirty-two to sixty-four TCUs, by the addition of only those modules (SSDRs, SSMC, etc.) in each SSU necessary to effect the switching path between the number of TCUs in the time stage.

It can be well appreciated by those skilled in the art that even though a single rail arrangement has been illustrated, a second duplicate copy of the space stage can be used in those T-S-T networks employing A and B rails. For example, a fully independently operating space stage would handle all time shared switching paths between TCUs on the A rail and similarly a second space stage would handle all switching between TCUs on the B rail. Both space stages would be identical to the other working independently handling switching between the TCUs connected to their respective rails. Thereby, the space stage described in this embodiment may be copied identically for each rail and is not limited thereto.

It can be appreciated that each one of the functional modules of FIG. 3 can be configured into circuit cards. The circuit cards in turn can be plugged into unit frames forming the SSUs. The circuit cards within the unit frames may be interconnected by a backplane arrangement. The SSDRs of each SSU in turn can be connected to the TCUs via the applicable bidirectional or unidirectional cables thereby, simplifying backplane wiring and the interconnections between the time stage and the space stage of the T-S-T network.

The present invention has been described to the reference of a specific embodiment thereof, for the purpose of illustrating the manner in which the invention may be used to advantage. It will be appreciated by those skilled in the art that the invention is not limited thereto. Accordingly, any and all modifications, variations or equivalent arrangements which may occur to those skilled in the art should be considered to be within the scope of the invention.

What is claimed is:

1. In a time-space-time network having a first time group including a plurality of originating time stages and a plurality of terminating time stages, and a second time group including at least one originating time stage and at least one terminating time stage, a space stage comprising:

a first space stage unit including a plurality of space stage matrix units connected together forming a space stage matrix having a plurality of inputs and a plurality of outputs, each space stage matrix unit including control inputs, a plurality of space stage driver/receiver interfaces each including inputs and outputs and each space stage driver/receiver interface input connected to a respective one of said first time group originating time stages and each space stage driver/receiver interface output connected to a respective one of said first time group terminating time stages, said space stage driver/receiver interfaces further connecting each of said first time group originating time stages and terminating time stages to an input and output respectively of said space stage matrix and control means connected to a source of control information for selectively interconnecting each of said first time group terminating time stages to said first time group originating time stages;

a second space stage unit including a space stage matrix unit having a plurality of inputs and a plurality of outputs, said space stage matrix unit including control inputs and a space stage driver/receiver interface including at least one input and output, said input connected to said second time group originating time stage and said output connected to said second time group terminating time stage, said space stage driver/receiver interface further connecting said second time group originating time stage and said second time group terminating time stage to one of said inputs and outputs of said space stage matrix unit and at least one control means connected to a source of control information for selectively interconnecting said second time group terminating time stage to said second time group originating time stage;

a third space stage unit including a plurality of space stage matrix units connected together forming a space stage matrix having a plurality of inputs and a plurality of outputs, each space stage matrix unit including control inputs, a plurality of space stage driver/receiver interfaces each including inputs and outputs and each space stage driver/receiver interface input connected to a respective one of said first time group originating time stages and one of said space stage driver/receiver interface outputs connected to said second time group terminating time stage, said space stage driver/receiver interfaces further connecting each of said first time group originating time stages to a space stage matrix input and said second time group terminating time stage to one of said space stage matrix outputs and at least one control means connected to a source of control information for selectively interconnecting at least one of said second time group terminating time stages to each of said plurality of first time group originating time stages; and a fourth space stage unit including a plurality of space stage matrix units connected together forming a space stage matrix having a plurality of inputs and a plurality of outputs, each space stage matrix unit including control inputs, a plurality of space stage driver/receiver interfaces each including inputs and outputs one of said space stage driver/receiver interface outputs connected to said second time group originating time stage and each of said space stage driver/receiver outputs connected to a respective one of said first time group originating time stages, said space stage driver/receiver interfaces further connecting said second time group originating time stage to one of said space stage matrix inputs and each of said first time group terminating time stages to respective space stage matrix outputs and control means connected to a source of control information for selectively interconnecting each of said plurality of first time group terminating time stages to at least one of said second time group originating time stages.

2. The space stage as claimed in claim 1, wherein said first space stage unit further includes:
a plurality of space stage memory control units each connected to respective space stage matrix unit control inputs, each space stage memory control unit arranged to receive and store control information enabling a selected switched path through said space stage matrix to a first time group terminating time stage from a first time group originating time stage; and
a space stage memory control interface connecting each of said plurality of space stage memory control units to a source of control information, said space stage memory control interface arranged to distribute said control information to each of said space stage memory control units.

3. The space stage as claimed in claim 1, wherein said second space stage unit further includes:
a space stage memory control unit connected to said space stage matrix unit control inputs, said space stage memory control unit arranged to receive and store control information enabling a switched path through said space stage matrix unit between said terminating time stage and originating time stage of said second time group; and
a space stage memory control interface connecting said space stage memory control unit to a source of control information, said space stage memory control interface arranged to distribute said control information to said space stage memory control unit.

4. The space stage as claimed in claim 1, wherein said third space stage unit further includes:
a space stage matrix control unit connected to said control inputs of one of said space stage matrix units, said space stage memory control unit arranged to receive and store control information enabling a switched path through one of said space stage matrix units from said second time group terminating time stage to said first time group plurality of originating time stages; and
a space stage memory control interface connecting said space stage memory control unit to a source of control information, said space stage memory control interface arranged to distribute said control information to said space stage memory control unit.

5. The space stage as claimed in claim 1, wherein said fourth space stage unit further includes:
a plurality of space stage memory control units each connected to respective space stage matrix unit control input, and each space stage memory control unit arranged to receive and store control information enabling a switched path through said space stage matrix from said second time group originating time stage to said first time group terminating time stages; and
a space stage memory control interface connecting said space stage memory control unit to a source of control information, said space stage memory control interface arranged to distribute said control information to each of said space stage memory control units.

6. The space stage as claimed in claim 2, wherein each of said plurality of space stage matrix units is comprised of a plurality of multiplexers connected together forming a matrix of selectable interconnections between at least sixteen inputs and sixteen outputs, each of said multiplexers including control inputs for connecting each of said multiplexer outputs to selected multiplexer inputs.

7. The space stage as claimed in claim 6, wherein said space stage matrix is comprised of at least four space stage matrix units forming a matrix of selectable interconnections between thirty-two inputs and thirty-two outputs.

8. The space stage as claimed in claim 7, wherein each of said plurality of space stage driver/receiver interfaces connects a maximum of two originating time stages and a maximum of two terminating time stages to a corresponding two of said space stage matrix inputs and outputs respectively.

9. The space stage as claimed in claim 8, wherein each of said space stage memory control units includes at least four control memories, and each control memory is connected to selected multiplexer control inputs, whereby responsive to said control information written to said control memories, each control memory connects associated multiplexer outputs to selected multiplexer inputs.

10. The space stage as claimed in claim 9, wherein said first space stage unit includes at least eight space stage memory control units allowing selectable interconnections of each of said first space stage units thirty-two outputs to said first space stage thirty-two inputs.

11. The space stage as claimed in claim 3, wherein said space stage matrix unit is comprised of a plurality of multiplexers connected together forming a matrix of selectable interconnections between sixteen inputs and sixteen outputs, each of said multiplexers including control inputs for connecting each of said multiplexer outputs to selected multiplexer inputs.

12. The space stage as claimed in claim 11, wherein said second time group is expandable to include more than one originating time stage and terminating time stage, said second space stage unit expandable to include:
three additional space stage matrix units connected together forming a space stage matrix of selectable interconnections between at least thirty-two inputs and thirty-two outputs responsive to the second time group including seventeen or more originating time stages and terminating time stages;
one space stage driver/receiver interface for every two originating time stages and terminating time stages included in said second time group, each space stage driver/receiver interface connecting associated originating time stages and terminal time stages to respective space stage matrix inputs and outputs; and
one space stage memory control unit for every four originating time stages and terminating time stages added to said second time group, each space stage memory control unit enabling a selected path through said space stage matrix from a terminating time stage to an originating time stage of said second time group.

13. The space stage as claimed in claim 12, wherein each of said space stage driver/receiver interfaces connects a maximum of two originating time stages and two terminating time stages to a corresponding two of said space stage matrix inputs and outputs respectively.

14. The space stage as claimed in claim 13, wherein said space stage memory control unit includes at least four control memories, each control memory connected to selected multiplexer control inputs, whereby responsive to said control information written in said control memories, each control memory connects associated multiplexer outputs to selected multiplexer inputs.

15. The space stage as claimed in claim 4, wherein each of said plurality of space stage matrix units is comprised of a plurality of multiplexers connected together forming a matrix of selectable interconnections between at least sixteen inputs and sixteen outputs, each of said multiplexers including control inputs for connecting each of said multiplexer outputs to each of said multiplexer inputs.

16. The space stage as claimed in claim 15, wherein said space stage matrix is comprised of at least four space stage matrix units forming a matrix of selectable interconnections between thirty-two inputs and thirty-two outputs.

17. The space stage as claimed in claim 16, wherein each of said plurality of space stage driver/receiver interfaces connects a maximum of two originating time stages and two terminating time stages to a corresponding two of said space stage matrix inputs and outputs respectively.

18. The space stage as claimed in claim 17, wherein said second time group is expandable to include more than one terminating time stage, said third space stage unit expandable to include:
one space stage memory control unit for every four terminating time stages added to said second time group, each space stage memory control unit enabling a selected path through said space stage matrix from associated second time group terminating time stages to selected originating time stages of said first time group.

19. The space stage as claimed in claim 18, wherein each of said space stage memory control units includes at least four control memories, each control memory connected to selected multiplexer control inputs, whereby responsive to said control information written in said control memories, each control memory connects associated multiplexer outputs to selected multiplexer inputs.

20. The space stage as claimed in claim 1, wherein each of said plurality of space stage matrix units is comprised of a plurality of multiplexers connected together forming a matrix of selectable interconnections between at least sixteen inputs and sixteen outputs, each of said multiplexers including control inputs for connecting each of said multiplexer outputs to each of said multiplexer inputs.

21. The space stage as claimed in claim 20, wherein said space stage matrix is comprised of at least four space stage matrix units forming a matrix of selectable interconnections between thirty-two inputs and thirty-two outputs.

22. The space stage as claimed in claim 21, wherein each of said plurality of space stage driver/receiver interfaces connects a maximum of two originating time stages and two terminating time stages to a corresponding two of said space stage matrix inputs and outputs respectively.

23. The space stage as claimed in claim 22, wherein each of said space stage memory control units includes at least four control memories, each control memory connected to selected multiplexer control inputs, whereby responsive to said control information written in said control memories, each control memory connects associated multiplexer outputs to selected multiplexer inputs.

24. The space stage as claimed in claim 23, wherein said fourth space stage unit includes at least eight space stage memory control units allowing selectable interconnections of said space stage matrix thirty-two outputs to said space stage matrix thirty-two inputs.

* * * * *